US012718812B2

(12) United States Patent
Martin et al.

(10) Patent No.: US 12,718,812 B2
(45) Date of Patent: Aug. 25, 2026

(54) AUTOMATIC PERSONALIZATION FOR SPEECH RECOGNITION SYSTEMS

(71) Applicant: Cisco Technology, Inc., San Jose, CA (US)

(72) Inventors: Stéphane Bernard Martin, Lausanne (CH); Erwan Barry Tarik Zerhouni, Zürich (CH); Mykola Baliuk, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 18/441,181

(22) Filed: Feb. 14, 2024

(65) Prior Publication Data

US 2025/0259627 A1 Aug. 14, 2025

(51) Int. Cl.
*G10L 15/22* (2006.01)
*G06F 40/284* (2020.01)

(52) U.S. Cl.
CPC ............ *G10L 15/22* (2013.01); *G06F 40/284* (2020.01); *G10L 2015/228* (2013.01)

(58) Field of Classification Search
CPC ................................ G10L 15/26; G10L 15/22
See application file for complete search history.

(56) References Cited

U.S. PATENT DOCUMENTS 10,109,273 B1 10/2018 Rajasekaram et al.
2014/0081636 A1* 3/2014 Erhart .................... G06Q 50/01 704/236
2014/0278411 A1 9/2014 Cheung
2018/0090130 A1 3/2018 Ljolje et al.
2021/0142789 A1 5/2021 Gurbani et al.
2022/0392432 A1* 12/2022 Alphonso ............... G10L 15/32
2023/0117535 A1 4/2023 Apsingekar et al.
2023/0267918 A1* 8/2023 Abid ....................... G10L 15/26 704/235

OTHER PUBLICATIONS

Chang F-J., et al., "Context-aware Transformer Transducer for Speech Recognition", arXiv:2111.03250v1 [cs.CL], Nov. 5, 2021, 8 Pages.
Fox J.D., et al., "Improving Contextual Recognition of Rare Words with an Alternate Spelling Prediction Model", arXiv:2209.01250v1 [cs.CL] , Sep. 2, 2022, 5 Pages.
Gourav A., et al., "Personalization Strategies for End-to-end Speech Recognition Systems", IEEE International Conference on Acoustics, Speech and Signal Processing (ICASSP), Jun. 2021, 5 Pages.
Le D., et al., "Deep Shallow Fusion for RNN-T Personalization", arXiv:2011.07754v1 [cs.CL], Nov. 16, 2020, 7 Pages.

* cited by examiner

*Primary Examiner* — Jialong He
(74) *Attorney, Agent, or Firm* — Lee & Hayes, P.C.

(57) ABSTRACT

According to one or more embodiments of the disclosure, automatic personalization for speech recognition systems is provided by a method that includes detecting, by a device, unrecognized words within an automated transcript of audio from a communication session and associating, by the device, the unrecognized words with corresponding contextual data. The method further includes identifying, by the device, a subset of the unrecognized words for boosting and applying, by the device, a context-specific boosting to the subset of the unrecognized words within an automated speech recognition model when criteria, identified based on contextual data associated with the subset of the unrecognized words, are met within the audio from the communication session.

20 Claims, 7 Drawing Sheets

AUTOMATIC PERSONALIZATION FOR SPEECH RECOGNITION SYSTEMS

TECHNICAL FIELD

The present disclosure relates generally to computer networks, and, more particularly, to automatic personalization for speech recognition systems.

BACKGROUND

Web conferencing technologies, such as WebEx from Cisco Systems, Inc., currently utilize speech recognition systems to provide speech-to-text capabilities. Speech recognition systems, such as automatic speech recognition systems (ASRs) are becoming increasingly prevalent, particularly as artificial intelligence technologies that are utilized by ASRs become more widespread. In general, an ASR system, which May be referred to as a "computer speech recognition system," or "speech-to-text system," relies on a computer program (e.g., a computer application) to process human speech to generate readable text.

However, ASRs may have difficulties in accurately reproducing personalized content, such as company names, company jargon, industry-specific terms, slang terms, etc. These difficulties can be especially pronounced in ASRs that employ end-to-end models. Incorporating contextual information into ASRs could help such systems to better recognize and transcribe spoken words, especially in cases where ambiguity or variability exist in the pronunciation of certain words or phrases.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

According to one or more embodiments of the disclosure, automatic personalization for speech recognition systems is provided by a method that includes detecting, by a device, unrecognized words within an automated transcript of audio from a communication session and associating, by the device, the unrecognized words with corresponding contextual data. The method further includes identifying, by the device, a subset of the unrecognized words for boosting and applying, by the device, a context-specific boosting to the subset of the unrecognized words within an automated speech recognition model when criteria, identified based on contextual data associated with the subset of the unrecognized words, are met within the audio from the communication session.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
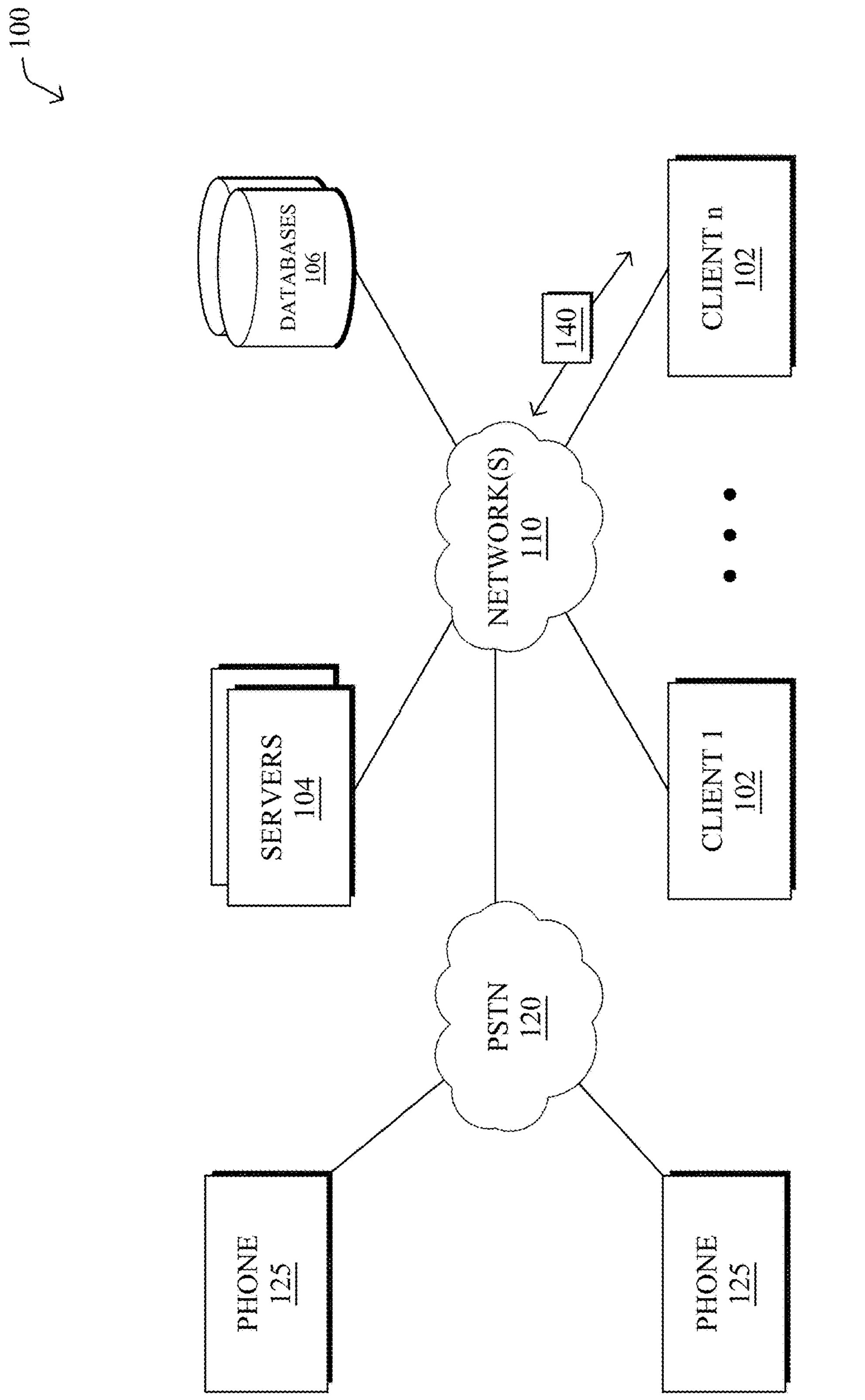
FIG. 1 illustrates an example communication network.

FIG. 1 is a schematic block diagram of an example computing system 100 illustratively comprising client devices (e.g., client devices 102, which may include a first through nth client device), servers 104 (e.g., one or more servers), and databases 106 (e.g., one or more databases), where the devices may be in communication with one another via one or more networks (e.g., network(s) 110). The network(s) 110 may include, as would be appreciated, any number of specialized networking devices such as routers, switches, access points, etc., interconnected via wired and/or wireless connections. For example, client devices 102, servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, collaboration endpoints, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

In addition, a separate public switched telephone network (PSTN 120) may also be considered to be a part of computing system 100, namely where phones 125 connect to the PSTN 120 in a standard manner (e.g., landlines, cellphones, and so on). The PSTN may be based on any number of carrier telephone networks which provide a connection to network(s) 110 for things such as conference calls, video calls, calls to voice over IP (VoIP) end points, and so on, as will be readily understood by those skilled in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
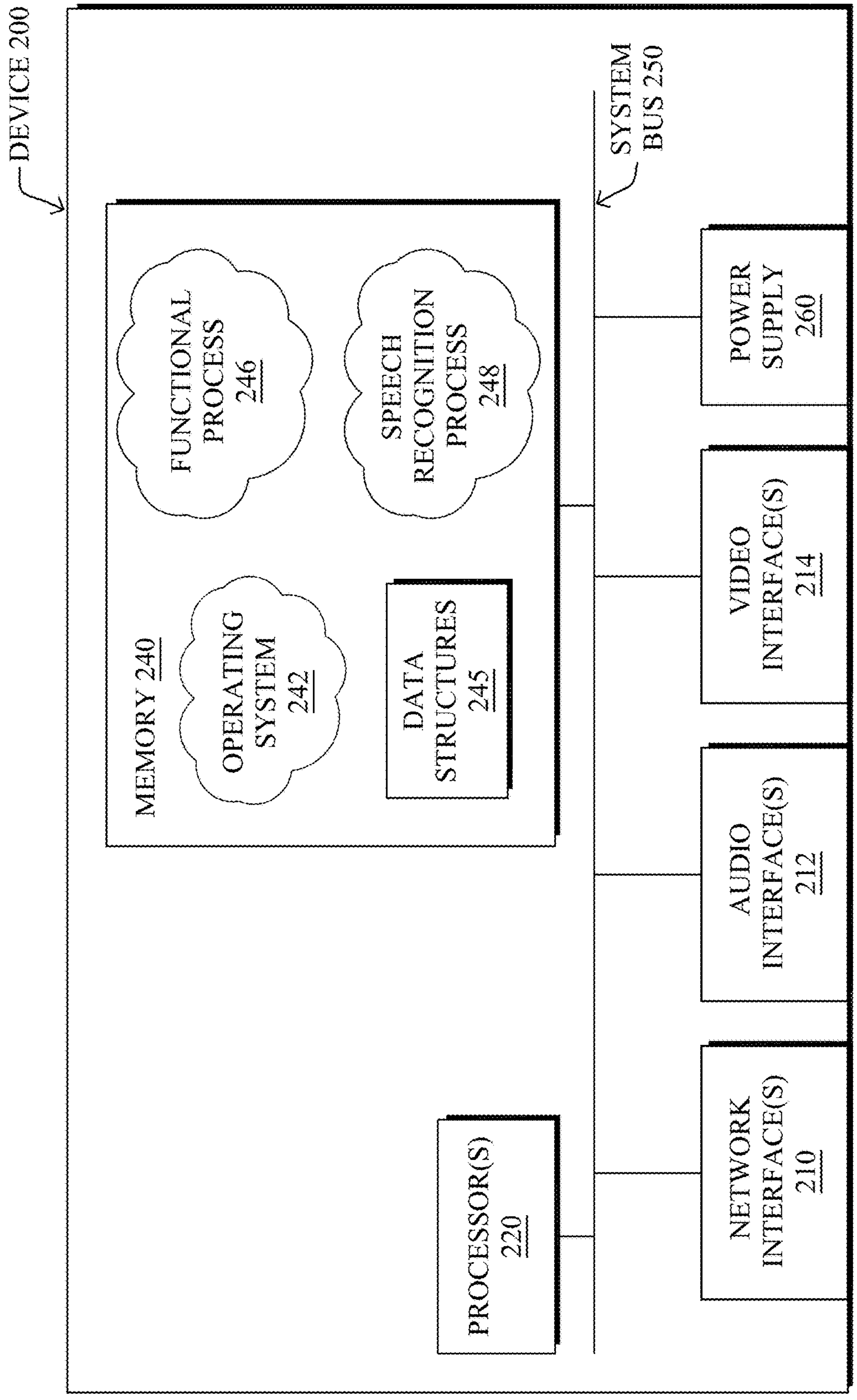
FIG. 2 illustrates an example network device/node.

FIG. 2 is a schematic block diagram of an example node such as device 200 (e.g., an apparatus) that may be used with one or more embodiments described herein, e.g., as any of the client devices 102, servers 104, databases 106 shown in FIG. 1 above. Device 200 may also be any other suitable type of device depending upon the type of network architecture in place, such as a collaboration endpoint, "receiver" (herein), etc. Device 200 may comprise one or more network interfaces (e.g., interfaces 210), one or more audio interfaces (e.g., audio interfaces 212), one or more video interfaces (e.g., video interfaces 214), one or more processors (e.g., processor(s) 220), and a memory 240 interconnected by a system bus 250, and is powered by a power supply 260.

The network interfaces (e.g., interfaces 210) include the mechanical, electrical, and signaling circuitry for communicating data over physical links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The audio interfaces 212 may include the mechanical, electrical, and signaling circuitry for transmitting and/or receiving audio signals to and from the physical area in which a device 200 is located. For instance, audio interfaces 212 may include one or more speakers and associated circuitry to generate and transmit soundwaves. Similarly, audio interfaces 212 may include one or more microphones and associated circuitry to capture and process soundwaves.

The video interfaces 214 may include the mechanical, electrical, and signaling circuitry for displaying and/or capturing video signals. For instance, video interfaces 214 may include one or more display screens. At least one of the display screens may comprise a touch screen, such as a resistive touchscreen, a capacitive touchscreen, an optical touchscreen, or other form of touchscreen display, to allow a user to interact with device 200. In addition, video interfaces 214 may include one or more cameras, allowing device 200 to capture video of a user for transmission to a remote device via interfaces 210. Such cameras may be mechanically controlled, in some instances, to allow for repositioning of the camera, automatically.

The memory 240 comprises a plurality of storage locations that are addressable by the processor(s) 220 and the interfaces 210 (e.g., network interfaces) for storing software programs and data structures associated with the embodiments described herein. The processor(s) 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes (e.g., functional processes 246), and on certain devices, a speech recognition process 248, as described herein. Notably, the functional processes 246, when executed by processor(s) 220, cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

For web-based conferencing services, such as a videoconference, teleconference, one-on-one (e.g., VoIP) calls, and so on, the functional processes 246 may be configured to allow device 200 to participate in a virtual meeting/conference during which, for example, audio data captured by audio interfaces 212 and optionally video data captured by video interfaces 214 is exchanged with other participating devices of the virtual meeting (or a videoconference) via interfaces 210. In addition, conferencing processes may provide audio data and/or video data captured by other participating devices to a user via audio interfaces 212 and/or video interfaces 214, respectively. As would be appreciated, such an exchange of audio and/or video data may be facilitated by a web conferencing service (e.g., Webex by Cisco Systems, Inc., etc.) that may be hosted in a data center, the cloud, or the like.

Figure 3:
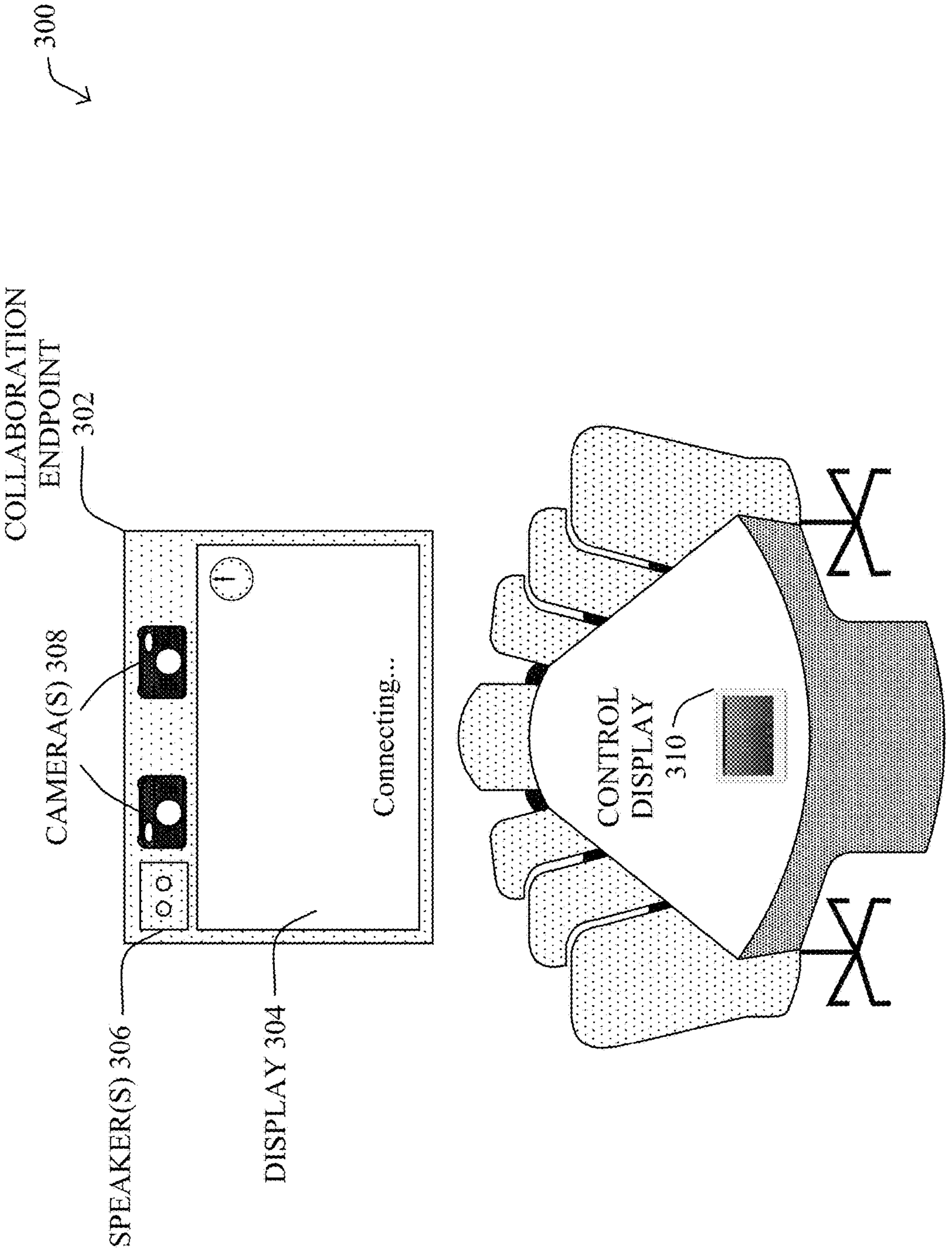
FIG. 3 illustrates various example components of an illustrative videoconferencing system.

For instance, FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such videoconferencing may be achieved via a videoconferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a virtual meeting (or a videoconference). Accordingly, collaboration endpoint 302 may also include a display 304 and/or speakers 306, to present such data to any virtual meeting (or a videoconference) participants located in meeting room 300.

Also as shown, a control display 310 may also be installed in meeting room 300 that allows a user to provide control commands for collaboration endpoint 302. For instance, control display 310 may be a touch screen display that allows a user to start a virtual meeting, make configuration changes for the videoconference or collaboration endpoint 302 (e.g., enabling or disabling a mute option, adjusting the volume, etc.).

In some cases, any of the functionalities of collaboration endpoint 302, such as capturing audio and video for a virtual meeting (or a videoconference), communicating with a videoconferencing service, presenting videoconference data to a virtual meeting participant, etc., may be performed by other devices, as well. For instance, a personal device such as a laptop computer, desktop computer, mobile phone, tablet, or the like, may be configured to function as an endpoint for a videoconference (e.g., through execution of a videoconferencing client application), in a manner similar to that of collaboration endpoint 302.

Figure 4:
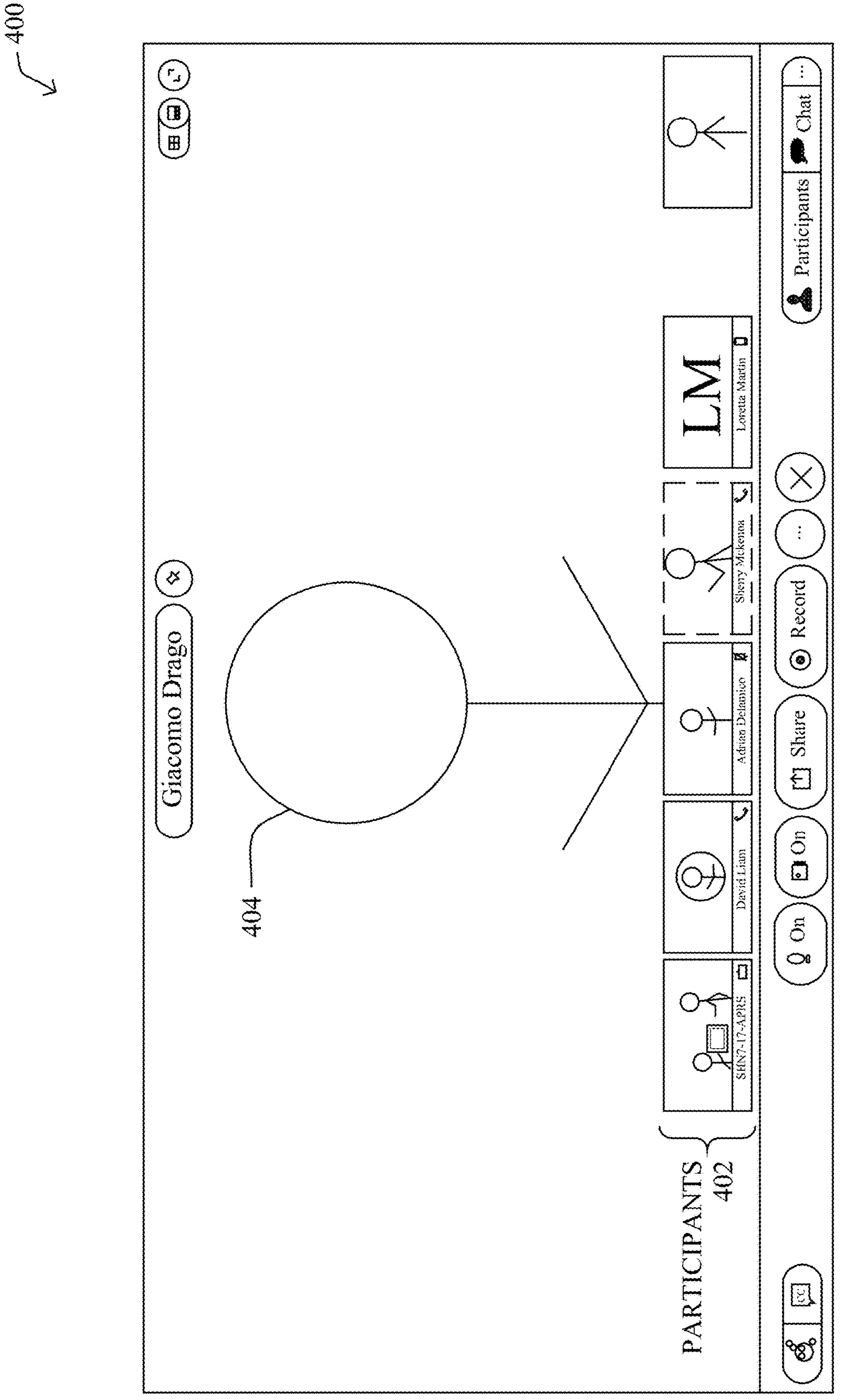
FIG. 4 illustrates an example display of a virtual meeting (or a videoconference)

In addition, FIG. 4 illustrates an example display 400 of a virtual meeting (or a videoconference), according to various embodiments. As shown, video for participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the videoconference, may be displayed in a prominent location on screen, with their video appearing much larger than that of participants 402. This may be considered a stage or presenter mode of the virtual meeting. However, other presentation modes are contemplated, for instance, where each participant shares an equal amount of the displayed conference, or where the current speaker is shown in the prominent view.

Other styles, configurations, and operations of web conferences, presentations, calls, and so on may be understood by those skilled in the art, and those shown and described above are merely examples that are not meant to be limiting to the scope of the present disclosure.

——Automatic Personalization for Speech Recognition Systems——

As mentioned above, the recognition of personalized content, such as company names, company jargon, industry-specific terms, slang terms, etc., continues to be problematic for automatic speech recognition (ASR) systems, especially for end-to-end models. Incorporating contextual information into ASR systems may help to better recognize and transcribe spoken words, especially in cases where ambiguity or variability exist in the pronunciation of certain words or phrases. This can improve the overall accuracy and usability of speech recognition technology in various applications, such as virtual assistants, speech-to-text transcription, and automated call centers, among other applications.

However, a major issue that can arise in improving ASR systems involves the question of how to retrieve a list of terms that a user (or other entity) wants to recognize and boost contextually (e.g., to provide "context boosting" whereby the transcription is biased toward using proper nouns, jargon, rare, and/or specialized words that are specific to people that are privy to a communication where the ASR system is deployed, such as in a meeting, voicemail, etc.) to improve the overall accuracy and usability of speech recognition technology across various applications.

The techniques herein provide for a system that includes a lexicon-free ASR module, a general lexicon module, a proposer module and a context enhancer module that are capable of learning subset of words specific to each context of use to improve the overall accuracy and usability of speech recognition technology across various applications. As described in further detail, herein, such a system can be regularly updated according to changes in the linguistic patterns of the users. As a result, the systems of the present disclosure may be able to generate more accurate text from speech, particularly with respect to company names, company jargon, industry-specific terms, slang terms, and/or technical terms, as well as handle accents of various speakers with various dialects and/or enunciations. These and other techniques disclosed herein can be broadly applied or can even be applied specifically to a company, a subset of employees of a company, or even a particular division, team, or workgroup within a company or other entity.

Specifically, according to one or more embodiments of the disclosure as described in detail below, automatic personalization for speech recognition systems is provided by a method that includes detecting, by a device, unrecognized words within an automated transcript of audio from a communication session and associating, by the device, the unrecognized words with corresponding contextual data. The method further includes identifying, by the device, a subset of the unrecognized words for boosting and applying, by the device, a context-specific boosting to the subset of the unrecognized words within an automated speech recognition model when criteria, identified based on contextual data associated with the subset of the unrecognized words, are met within the audio from the communication session.

Illustratively, the techniques described herein may be performed by hardware, software, and/or firmware, such as in accordance with the speech recognition process 248, which may include computer executable instructions executed by the processor(s) 220 (or independent processor of interfaces 210) to perform functions relating to the techniques described herein, e.g., in conjunction with the functional processes 246.

Figure 5:
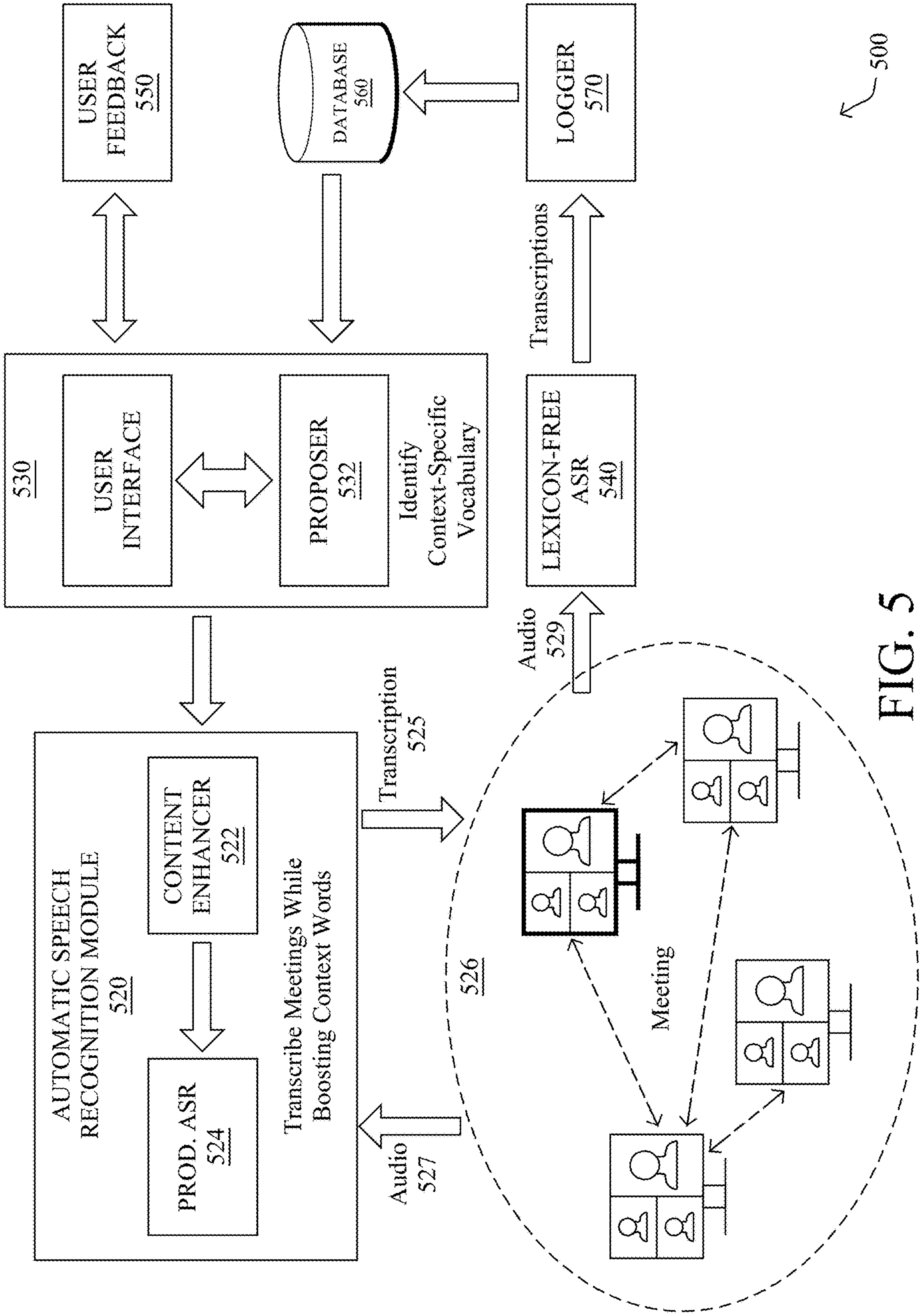
FIG. 5 illustrates an example architecture for an automatic personalization for speech recognition system.

Operationally, FIG. 5 illustrates an example architecture for an automatic personalization for speech recognition system. The system 500 of FIG. 5 includes an automatic speech recognition module 520 that includes a context enhancer module 522 and/or a production ASR module 524. As shown in FIG. 5, the automatic speech recognition module 520, in conjunction with the modules and/or components shown therein can transcribe meetings while boosting context words. It will be appreciated that, while the non-limiting examples described herein focus on transcribing meetings, the techniques of the present disclosure are applicable to any context in which ASR systems or other speech-to-text systems are utilized.

As shown in FIG. 5, the automatic speech recognition module 520 can send and/or receive audio 527 and/or transcription 525 from a meeting 526. The meeting 526 may involve multiple devices (e.g., computers, smartphones, laptops, etc.) and may involve multiple users, some of whom may be located in different physical locations from a device where such a meeting is hosted or initiated. In the illustrative example of FIG. 5, the automatic speech recognition module 520 receives audio 527 from the meeting 526 and transmits the transcription 525 to the meeting 526.

The automatic speech recognition module 520 can be communicatively coupled to a user interface 530 in order to display various information to users of the system 500. The user interface 530 can receive and/or transmit information from a proposer module 532 in order to identify context-specific vocabulary in accordance with the disclosure.

In addition, audio 529 from the meeting 526 can, as shown in FIG. 5, be provided to a lexicon-free ASR 540 that can process the audio and provide transcriptions of the audio 529 to a logger module 570. The logger module 570 can be in communication with a database 560 and, accordingly, the logger module 570 can provide the transcriptions of the audio 529 to the database 560. Further, the database 560 can be in communication with the user interface 530 and/or the proposer module 532.

Optionally, as shown in FIG. 5, the user interface 530 and/or the proposer module 532 can be configured to receive user feedback 550 and/or to provide information to a user feedback 550 module in order to support and/or improve the techniques described herein.

In some implementations, the automatic speech recognition module 520 (or "ASRM") can be deployed in a cloud (e.g., the cloud 621 of FIG. 6) computing environment. The automatic speech recognition module 520 can be responsible for the automatic transcription of live meetings or other scenarios in which voice activity is being recorded or monitored. As shown in FIG. 5, the automatic speech recognition module 520 includes a production ASR module 524. The production ASR module 524 can be either lexicon-based or lexicon-free.

In some implementations, the production ASR module 524 can generate live transcripts, for example of a meeting or other voice activity. In addition, a secondary ASR module, e.g., the lexicon-free ASR 540 is also provided in the system 500. In general, a lexicon-free speech recognition model does not rely on a predefined dictionary or lexicon of words to transcribe spoken language. The main reason for using a lexicon-free ASR is that it can produce new words without the need of being provided with a predefined lexicon.

In a first implementation, the production ASR module 524 can be lexicon-based and the secondary ASR (e.g., the lexicon-free ASR 540 is either an offline or online model. Implementations are not so limited, however, and in a second implementation, the production ASR module 524 can be either lexicon-based or lexicon-free, but the secondary ASR can be a more accurate offline ASR, which cannot be run during meetings.

After the end of a meeting or other voice activity event, the secondary ASR can be used to produce an alternative transcript (AT), that is, a transcript that is different than the one proposed by the production ASR module 524. In such implementations, the output of secondary ASR is then the AT and a list of the participants in the meeting (or other voice activity event), plus any relevant metadata that is available.

Continuing with the non-limiting example of FIG. 5, the logger module 570, which can also be deployed in the cloud, receives as input the AT and the list of the participants in the meeting (or other voice activity event). It is noted that the list of participants is utilized to provide improved personalization, and/or in order to avoid boosting company jargons to non-authorized people on the grounds of security and confidentiality.

For every participant, the logger module 570 can compare every word in the transcript with a large general lexicon precompiled for the language. If a word does not exist in the lexicon, that word can be added in a database 560 along with the list of participants and the metadata. In this manner, the database 560 can store a list of past meetings (or other voice activity events), with relevant data (e.g., time, list of participants, metadata, title, etc.), and a list of the new words uttered in each meeting, with their authors. Over time, the database 560 can therefore collect the raw data necessary for the computation of various statistics on words, participants and meetings for use by the proposer module 532.

Based on the data contained in the database 560, which is described above, the proposer module 532 can compute a sub-list of the most interesting candidate words that should be promoted during the transcription of further meetings or other voice activity events. In order to validate these words, they are proposed to the users for user feedback 550 via the user interface 530 (e.g., via a graphical user interface). By operating the user interface 530, the users can accept, refuse or amend the candidate words. If a candidate word is accepted, with or without modification, it is flagged as a context word and is passed to the context enhancer module 522.

In some implementations, a single person in the organization can be responsible for accepting or rejecting new context words. However, implementations are not so limited and, in some implementations, any user in a meeting (or other voice activity event) in which the context word appears can accept new context words. Additionally, the proposer module 532 can also suggest the removal of a word previously inserted in one of the lists of contextually boosted words under appropriate criteria, for instance if the context word has not been seen for a certain period.

Finally, the context enhancer module 522 can receive the context words as an input from the proposer module 532 and can promote these words in the relevant situation. That is, the context enhancer module 522 can boost the appearance (accuracy) of the words in the output of the production ASR module 524 of the automatic speech recognition module 520. Several such techniques, which can be language model based or acoustic based, can be utilized to this end. For example, shallow fusion techniques, context aware encoder techniques, or other suitable techniques can be utilized to boost the appearance (accuracy) of the promoted words.

In some implementations, context words are chosen at meeting-level, i.e., in a given meeting the words of all the participants are boosted. Implementations are not so limited, however, and in other implementations, only context words that are shared by all the participants of a meeting are promoted. In yet other implementations, context words are promoted in accordance with the company's structure, for example, lists of boosted words are established for a group of employees belonging to a same team, or across a company division, etc.

For training an End-To-End Speech recognition model, a technique called sub-word tokenization can be employed to tokenize any words. Sub-word tokenization can be used in natural language processing (NLP) to break down words into smaller units called sub-word tokens. Unlike traditional tokenization, where words are treated as individual units, sub-word tokenization splits words into smaller parts, which helps in handling out-of-vocabulary words, reducing vocabulary size, and improving generalization. In accordance with this technique, any unseen word can be split into multiple tokens. The End-To-End model recognize tokens that are then recomposed into words. Hence, the model can recognize any unseen word. By utilizing these and other techniques disclosed herein, sequences of tokens that represent to company names, company jargon, industry-specific terms, slang terms, and/or technical terms, as well as handle accents of various speakers with various dialects and/or enunciations, etc. can be boosted.

In some implementations, the proposer module 532 can propose words to the users, and the users can be responsible for accepting, correcting or refusing a word. In such implementations, words can be proposed based on the following criterion: frequency of usage, frequency of usage per user, number of users (both present during the meeting and speakers), etc. Further, more advanced technique can also be used such as word relevance ranking, keyword extraction, or other similar techniques. These techniques can be applied offline on the whole meeting transcript or online in real time.

Figure 6:
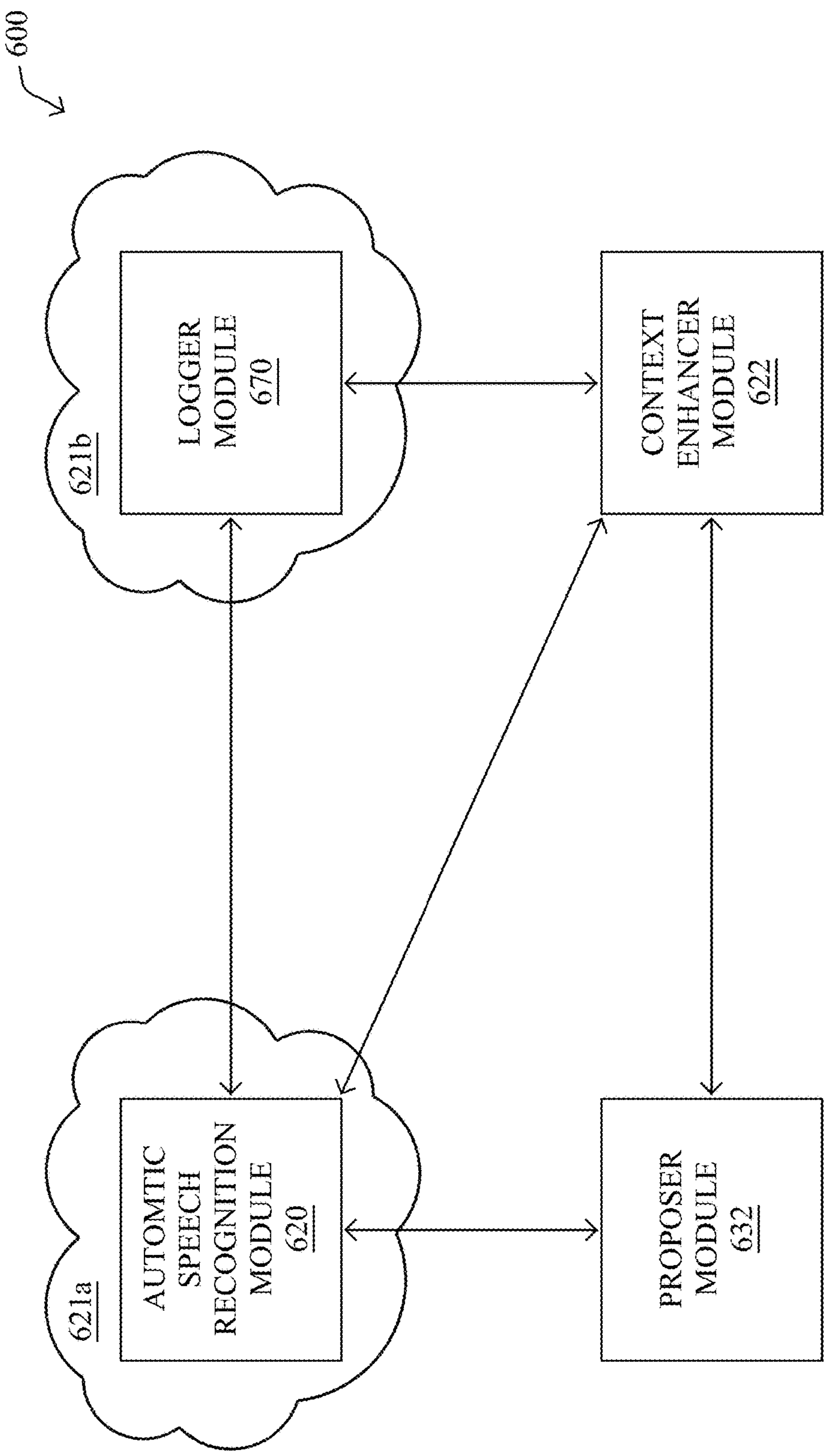
FIG. 6 illustrates another example architecture for an automatic personalization for speech recognition system.

FIG. 6 illustrates another example architecture for an automatic personalization for speech recognition system. The system 600 of FIG. 6 includes an automatic speech recognition module 620, which can be deployed in a cloud 621*a* computing environment, a context enhancer module 622, a proposer module 632, and a logger module 670, which can be deployed in a cloud 621*b* computing environment. In some implementations, the automatic speech recognition module 620 can be analogous to the automatic speech recognition module 520 of FIG. 5, while the context enhancer module 622, the proposer module 632, and the logger module 670 can be analogous to the context enhancer module 522, the proposer module 532, and the logger module 570 of FIG. 5, respectively.

Analogous components and modules of the system 600 of FIG. 6 operate as described in connection with FIG. 5. Accordingly, FIG. 6 is provided as a simplified system view of implementations of the present disclosure and is intended to show relationships between the key components and modules in a non-obfuscated manner to more clearly elucidate aspects of the present disclosure.

Figure 7:
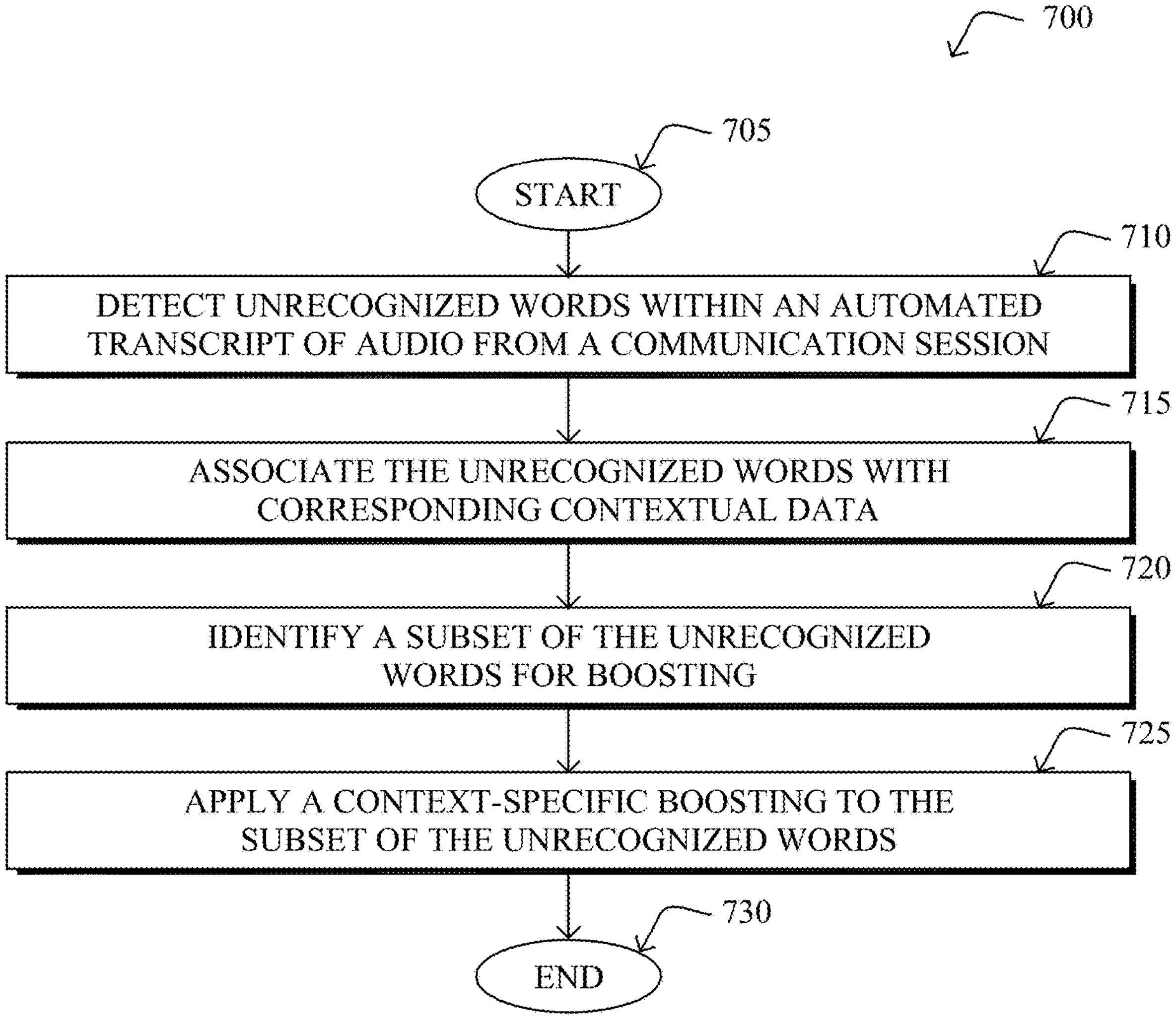
FIG. 7 illustrates an example simplified procedure for an automatic personalization for speech recognition system in accordance with one or more implementations described herein.

FIG. 7 illustrates an example simplified procedure for an automatic personalization for speech recognition system in accordance with one or more implementations described herein. For example, a non-generic, specifically configured device (e.g., device 200) may perform procedure 700 by executing stored instructions (e.g., speech recognition process 248). The procedure 700 may start at step 705, and continues to step 710, where, as described in greater detail above, a device detects unrecognized words within an automated transcript of audio from a communication session. In some implementations, detecting the unrecognized words may include identifying a portion of words in the automated transcript that do not exist within a precompiled large general lexicon as the unrecognized words.

The procedure 700 continues to step 715 where, as described in greater detail above, the device associates the unrecognized words with corresponding contextual data. In some implementations, the corresponding contextual data may comprise an identification of a participant in the communication session associated with the audio.

The procedure 700 continues to step 720 where, as described in greater detail above, the device identifies a subset of the unrecognized words for boosting. In some implementations, the subset of the unrecognized words for boosting can be identified based on one or more of: frequency of word usage, frequency of word usage per meeting participant, number of participants in the communication session, relevance ranking, or keyword extraction, or any combination thereof.

Implementations are not so limited, however, and in some implementations, identifying the subset of the unrecognized words for boosting can include sub-word tokening the unrecognized words within the automated transcript of the audio and recomposing sequences of tokenized word portions into the subset of the unrecognized words. Further, as described above, identifying the subset of the unrecognized words for boosting can include proposing the subset of the unrecognized words via a user interface and flagging the subset of the unrecognized words as boosting candidates based on feedback collected via the user interface.

The procedure 700 continues to step 725 where, as described in greater detail above, the device applies a context-specific boosting to the subset of the unrecognized words within an automated speech recognition model when criteria, identified based on contextual data associated with the subset of the unrecognized words, are met within the audio from the communication session. Applying the context-specific boosting to the subset of the unrecognized words can include causing the subset of the unrecognized words to appear more accurately in the automated transcript of the communication session based on communication session identification characteristics meeting the criteria.

Implementations are not so limited, however, and in some implementations, applying the context-specific boosting to the subset of the unrecognized words can include causing the subset of the unrecognized words to appear more accurately in the automated transcript of the communication session based on all participants of the communication session being associated with the subset of the unrecognized words. In other implementations, applying the context-specific boosting to the subset of the unrecognized words can include causing the subset of the unrecognized words to appear more accurately in the automated transcript of the communication session based on an organizational relationship of participants of the communication session to the subset of the unrecognized words. Still, in other implementations, applying the context-specific boosting to the subset of the unrecognized words can include boosting the sequences of tokenized word portions in the automated speech recognition model.

In some implementations, the procedure 700 can include removing a word from a list of contextually boosted words when a frequency occurrence falls below a threshold level within a period of time.

The procedure 700 may then end at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

In some implementations, an apparatus comprising one or more network interfaces to communicate with a network, a processor coupled to the one or more network interfaces and configured to execute one or more processes, and a memory configured to store a process that is executable by the processor. In such implementations, the process, when executed, may be configured to detect unrecognized words within an automated transcript of audio from a communication session; associate the unrecognized words with corresponding contextual data; identify a subset of the unrecognized words for boosting; and apply a context-specific boosting to the subset of the unrecognized words within an automated speech recognition model when criteria, identified based on contextual data associated with the subset of the unrecognized words, are met within the audio from the communication session.

In still other implementations, a tangible, non-transitory, computer-readable medium can have computer-executable instructions stored thereon that, when executed by a processor on a computer, cause the computer to perform a method comprising detecting unrecognized words within an automated transcript of audio from a communication session; associating the unrecognized words with corresponding contextual data; identifying a subset of the unrecognized words for boosting; and applying a context-specific boosting to the subset of the unrecognized words within an automated speech recognition model when criteria, identified based on contextual data associated with the subset of the unrecognized words, are met within the audio from the communication session.

The techniques described herein, therefore, provide for a system that includes a lexicon-free ASR module, a general lexicon module, a proposer module and a context enhancer module that are capable of learning subset of words specific to each context of use to improve the overall accuracy and usability of speech recognition technology across various applications. As a result, the systems of the present disclosure may be able to generate more accurate text from speech, particularly with respect to company names, company jargon, industry-specific terms, slang terms, and/or technical terms, as well as handle accents of various speakers with various dialects and/or enunciations.

Illustratively, the techniques described herein may be performed by hardware, software, and/or firmware, (e.g., an "apparatus") such as in accordance with the speech recognition process 248, e.g., a "method"), which may include computer-executable instructions executed by the processor(s) 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process (e.g., the speech recognition process 248).

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as such as for videoconferencing services, other suitable technologies, protocols, and associated devices may be used in accordance with the techniques described above, such as one-on-one video communication protocols (e.g., video calls). In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

It should be noted that while certain steps within procedures above may be optional as described above, the steps shown and described are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures are described separately, certain steps from each procedure may be incorporated into each other procedure, and the procedures are not meant to be mutually exclusive.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:

detecting, by a device, unrecognized words for boosting in a subsequent communication session, wherein detecting the unrecognized words comprises, after an end of a communication session, generating, by a secondary automatic speech recognition module, an alternative transcript of audio from the communication session, the alternative transcript being different from a transcript generated during the communication session by a production automatic speech recognition module, and identifying, as the unrecognized words, words in the alternative transcript that do not exist within a precompiled general lexicon;

associating, by the device, the unrecognized words with corresponding contextual data;

identifying, by the device, a subset of the unrecognized words for boosting in the subsequent communication session; and applying, by the device, a context-specific boosting to the subset of the unrecognized words within an automated speech recognition model when criteria are met within audio from a subsequent communication session, the criteria identified based on the contextual data associated with the subset of the unrecognized words.

2. The method as in claim 1, wherein associating the unrecognized words with the corresponding contextual data comprises storing the unrecognized words together with a list of participants in the communication session and metadata for the communication session, and wherein identifying the subset of the unrecognized words for boosting comprises computing, based on stored data for past communication sessions, statistics on words, participants, and communication sessions to identify the subset.

3. The method as in claim 1, wherein the corresponding contextual data comprises an identification of a participant in the communication session associated with the audio.

4. The method as in claim 1, wherein the subset of the unrecognized words for boosting are identified based on one or more of: frequency of word usage, frequency of word usage per meeting participant, number of participants in the communication session, relevance ranking, or keyword extraction.

5. The method as in claim 1, wherein identifying the subset of the unrecognized words for boosting includes:

proposing the subset of the unrecognized words via a user interface; and flagging the subset of the unrecognized words as boosting candidates based on feedback collected via the user interface.

6. The method as in claim 1, further comprising:

removing a word from a list of contextually boosted words when a frequency occurrence falls below a threshold level within a period of time.

7. The method as in claim 1, wherein applying the context-specific boosting to the subset of the unrecognized words includes:

causing the subset of the unrecognized words to appear more accurately in an automated transcript of the subsequent communication session based on communication session identification characteristics meeting the criteria.

8. The method as in claim 1, wherein applying the context-specific boosting to the subset of the unrecognized words includes:

causing the subset of the unrecognized words to appear more accurately in an automated transcript of the subsequent communication session based on all participants of the communication session being associated with the subset of the unrecognized words.

9. The method as in claim 1, wherein applying the context-specific boosting to the subset of the unrecognized words includes:

causing the subset of the unrecognized words to appear more accurately in an automated transcript of the subsequent communication session based on an organizational relationship of participants of the communication session to the subset of the unrecognized words.

10. The method as in claim 1, wherein identifying the subset of the unrecognized words for boosting includes:

sub-word tokening the unrecognized words within an automated transcript of the audio; and recomposing sequences of tokenized word portions into the subset of the unrecognized words.

11. The method as in claim 10, wherein applying the context-specific boosting to the subset of the unrecognized words includes:

boosting the sequences of tokenized word portions in the automated speech recognition model for the subsequent communication session.

12. An apparatus, comprising:

one or more network interfaces;

a processor coupled to the one or more network interfaces and configured to execute one or more processes; and a memory configured to store a process that is executable by the processor, the process when executed configured to:

detect unrecognized words within an automated transcript of audio from a communication session;

associate the unrecognized words with corresponding contextual data;

identify a subset of the unrecognized words for boosting, wherein identifying includes sub-word tokenizing the unrecognized words within the automated transcript of the audio from the communication session and recomposing sequences of tokenized word portions into the subset of the unrecognized words; and apply a context-specific boosting to the subset of the unrecognized words within an end-to-end automated speech recognition model when criteria, identified based on contextual data associated with the subset of the unrecognized words, are met within the audio from the communication session, wherein applying includes boosting the sequences of tokenized word portions in the end-to-end automated speech recognition model, the end-to-end automated speech recognition model being configured to recognize the tokenized word portions and recompose the tokenized word portions into words.

13. The apparatus as in claim 12, wherein the process to detect the unrecognized words includes identifying a portion of words in the automated transcript that do not exist within a precompiled large general lexicon as the unrecognized words.

14. The apparatus as in claim 12, wherein the corresponding contextual data comprises an identification of a participant in the communication session associated with the audio.

15. The apparatus as in claim 12, wherein the subset of the unrecognized words for boosting are identified based on one or more of: frequency of word usage, frequency of word usage per meeting participant, number of participants in the communication session, relevance ranking, or keyword extraction.

16. The apparatus as in claim 12, wherein the process to identify the subset of the unrecognized words for boosting includes:

proposing the subset of the unrecognized words via a user interface; and flagging the subset of the unrecognized words as boosting candidates based on feedback collected via the user interface.

17. The apparatus as in claim 12, the process when executed is further configured to:

remove a word from a list of contextually boosted words when a frequency occurrence falls below a threshold level within a period of time.

18. The apparatus as in claim 12, wherein the process to apply the context-specific boosting to the subset of the unrecognized words includes one or more of:

causing the subset of the unrecognized words to appear more accurately in the automated transcript of the communication session based on communication session identification characteristics meeting the criteria;

causing the subset of the unrecognized words to appear more accurately in the automated transcript of the communication session based on all participants of the communication session being associated with the subset of the unrecognized words; or causing the subset of the unrecognized words to appear more accurately in the automated transcript of the communication session based on an organizational relationship of participants of the communication session to the subset of the unrecognized words.

19. The apparatus as in claim 12, wherein the corresponding contextual data includes a list of participants associated with the subset of the unrecognized words, and wherein the context-specific boosting is restricted to subsequent communication sessions in which all participants are included in the list of participants.

20. A tangible, non-transitory, computer-readable medium storing program instructions that cause a device to execute a process comprising:

detecting unrecognized words within an automated transcript of audio from a communication session;

associating the unrecognized words with corresponding contextual data;

identifying a subset of the unrecognized words for boosting, by computing, from words stored from past communication sessions and corresponding contextual data associated with the words, a sub-list of candidate words to be promoted during transcription of subsequent communication sessions; and applying a context-specific boosting to the subset of the unrecognized words within an automated speech recognition model for audio from a subsequent communication session involving a plurality of participants, wherein the context-specific boosting promotes only those words in the subset of the unrecognized words that are shared by all participants of the plurality of participants of the subsequent communication session.

* * * * *